United States Patent

[11] 3,576,476

[72] Inventor George Kerr
Emmasingel, Eindhoven, Netherlands
[21] Appl. No. 806,893
[22] Filed Mar. 13, 1969
[45] Patented Apr. 27, 1971
[73] Assignee U.S. Philips Corp.
[32] Priority Sept. 30, 1968
[33] Netherlands
[31] 6813997

[54] MESH EMITTER TRANSISTOR WITH SUBDIVIDED EMITTER REGIONS
4 Claims, 3 Drawing Figs.

[52] U.S. Cl. .......... 317/235
[51] Int. Cl. .......... H01l 11/06
[50] Field of Search .......... 317/235/40.13, 29

[56] References Cited

UNITED STATES PATENTS

| | | | |
|---|---|---|---|
| 3,225,261 | 12/1965 | Wolf | 317/235 |
| 3,444,443 | 5/1969 | Moroshima | 317/235 |
| 3,462,658 | 8/1969 | Worchel et al. | 317/235 |

OTHER REFERENCES

Electronics, " Part III: Combing the Field for Ways to Match Overlays Performance" by Eimbinder. Aug. 23, 1965, 317/235, pages 82— 84.

*Primary Examiner*—Jerry D. Craig
*Attorney*—Frank R. Trifari

ABSTRACT: A mesh emitter transistor for high power, high frequency uses is described. Improved performance is obtained by subdividing the apertured emitter region into at least two portions separated by a base region.

Patented April 27, 1971 3,576,476

2 Sheets-Sheet 1

Figure 1:
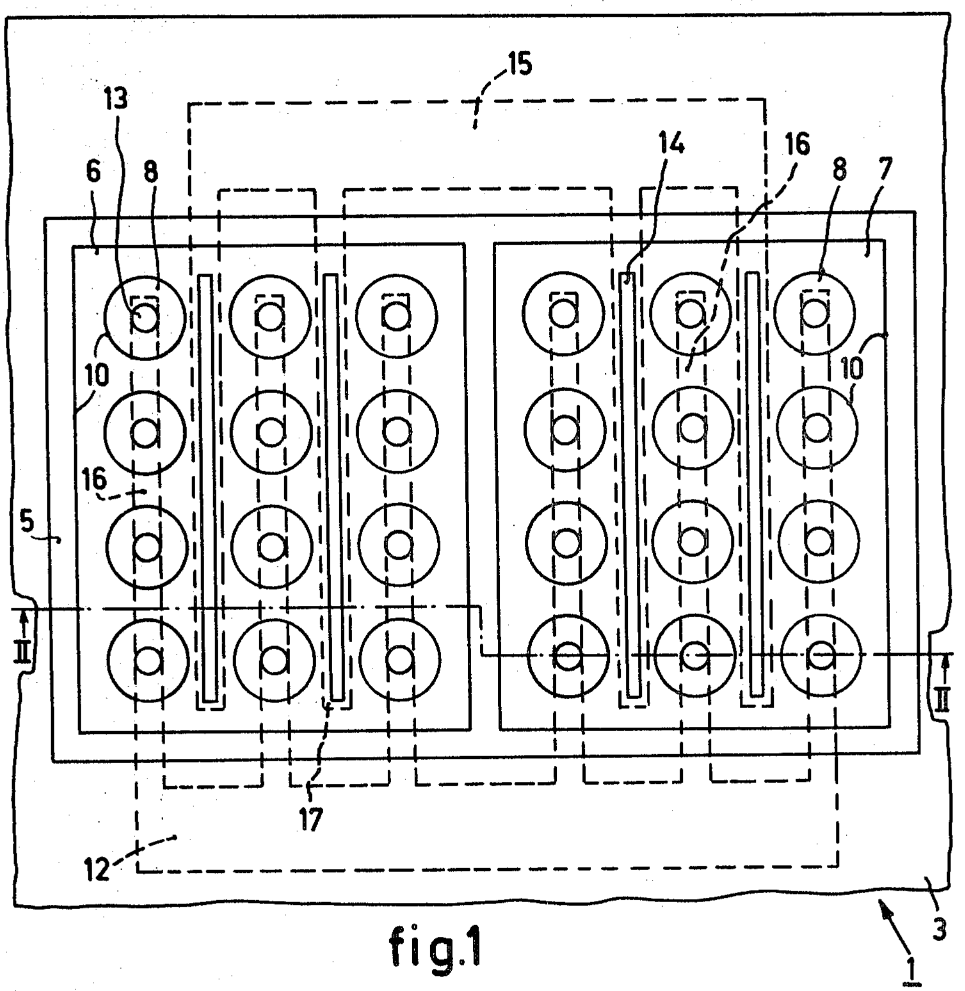

INVENTOR.
GEORGE KERR
BY

AGENT

INVENTOR.

GEORGE KERR

BY

AGENT

MESH EMITTER TRANSISTOR WITH SUBDIVIDED EMITTER REGIONS

The invention relates to a transistor which comprises a semiconductor body having a collector region, a base region adjacent a substantially plane surface, and a layer-shaped apertured emitter region which along one face adjoins the said surface and for the rest is entirely surrounded by the base region, the base region adjoining the said surface in the apertures of the emitter region, the said surface being provided with an insulating layer which covers at least the line of intersection of the emitter-base junction with this surface, the base region, at least at the sides of the said apertures, and the emitter region being connected to a base contact and an emitter contact, respectively, through windows in the insulating layer.

Such transistors, which are eminently suited for high powers are known from "Electronics," Dec. 11, 1967, pages 110—114. It is of importance for such a structure having an apertured emitter region to give a large emitter periphery length per unit area of the transistor and furthermore in such a mesh emitter the likelihood of second breakdown is smaller than in the case of an emitter region subdivided in a plurality of small discrete component regions, since in a mesh emitter an increase in current density can spread over a large part of the emitter region before it reaches a local density such as to produce second breakdown.

The mesh emitter is an important improvement on the emitter subdivided into discrete component regions, mainly because of the fact that the mesh emitter is a continuous region. Such a continuous emitter region has a large emitter periphery length per unit area of the transistor and also a high permissible current density per unit length of the emitter periphery. Owing to the coherence and the low resistivity of the emitter region, the electric resistance between the various parts and the emitter periphery is low and satisfactory distribution of current over the emitter periphery is promoted.

It should be noted that the expression "emitter periphery length per unit area of the transistor" is to be understood to mean the length of the line of intersection of the emitter-base junction with the said substantially plane surface of the transistor per unit area of that portion of the substantially plane surface which the base and emitter regions adjoin.

Especially with regard to high power transistors it is of importance for the current density per unit length of the emitter periphery obtainable with the mesh emitter to be increased to provide transistors of compact structure with a low base-collector capacitance. This low capacitance is of partial importance for high-frequency use of the transistor.

It is an object of the invention to provide a transistor having an increased permissible current density per unit area of the transistor, and the invention is based on the empiric recognition that the said current density can be increased by a surprising and simple step without the likelihood of the occurrence of second breakdown.

According to the invention a transistor of the kind described in the preamble is characterized in that the apertured emitter region comprises at least two portions separated by the base region.

The fact that this simple step results in a significant improvement is the more surprising because the useful properties of the known mesh emitter are particularly ascribed to the coherence of the emitter region which provides an advantageous combination of satisfactory current distribution and large periphery length per unit area. In complete contrast with this idea it has now been found that breaking this continuity by dividing the mesh emitter region into discrete component regions results in a significant improvement of this structure.

It should be noted that the division of the mesh emitter region into discrete component mesh regions may result in a decrease in the emitter periphery length per unit area of the transistor. This reduction, however, is amply offset by the increase in permissible current density per unit length of the emitter periphery so that the use of the invention provides transistors having a more compact structure and lower internal capacitances.

An important embodiment of the transistor in accordance with the invention is characterized in that each component part of the emitter region has at least two adjacent rows of apertures, the base contact having the form of a base contact layer which is situated on the insulating layer and has a plurality of fingers each of which extends over a row of apertures and is connected to the base region at least at the sites of these apertures, the emitter contact having the form of an emitter contact layer which is situated on the insulating layer and has a plurality of fingers which are connected to the emitter region, the base and emitter contact layers forming an interdigitated system.

A mesh emitter region divided into component regions in the above manner yields very good results.

The current distribution between the various component mesh emitter regions may be further improved by including resistors in the current paths between the connection lead of the emitter and the various component regions.

A transistor the emitter contact of which is provided with a connecting lead is preferably characterized in that at least one series resistor is included in the path connection each of the discrete component parts of the emitter region to the connecting lead.

In operation of the transistor the inclusion of these resistors gives rise to a feedback effect by which the current distribution between the component regions is promoted. In addition, the values of the various resistors may be chosen such that the electric resistances along the current paths between the connecting lead and the component regions are substantially equal for all component regions.

An important embodiment of the transistor in accordance with the invention in which series resistors are included in the connecting paths between the connecting lead and the component mesh emitter regions is characterized in that at least some of the said resistors form part of a single continuous resistance layer.

This transistor exhibits a high permissible current density per unit area of the transistor and can furthermore be manufactured in a simple manner, the provision of the series resistors requiring no critical additional steps.

In order that the invention may readily be carried into effect, embodiments thereof will now be described with reference to the accompanying diagrammatic drawings, in which FIG. 1 is a schematic top plan view of an embodiment of a transistor in accordance with the invention.

Figure 2:
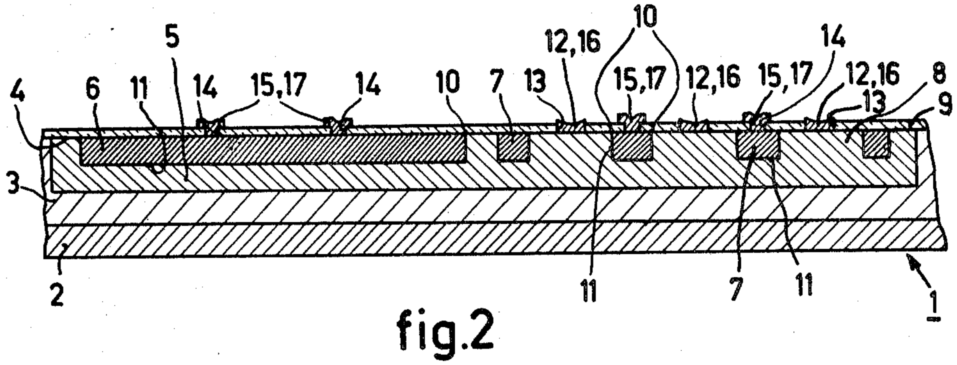
Figure 3:
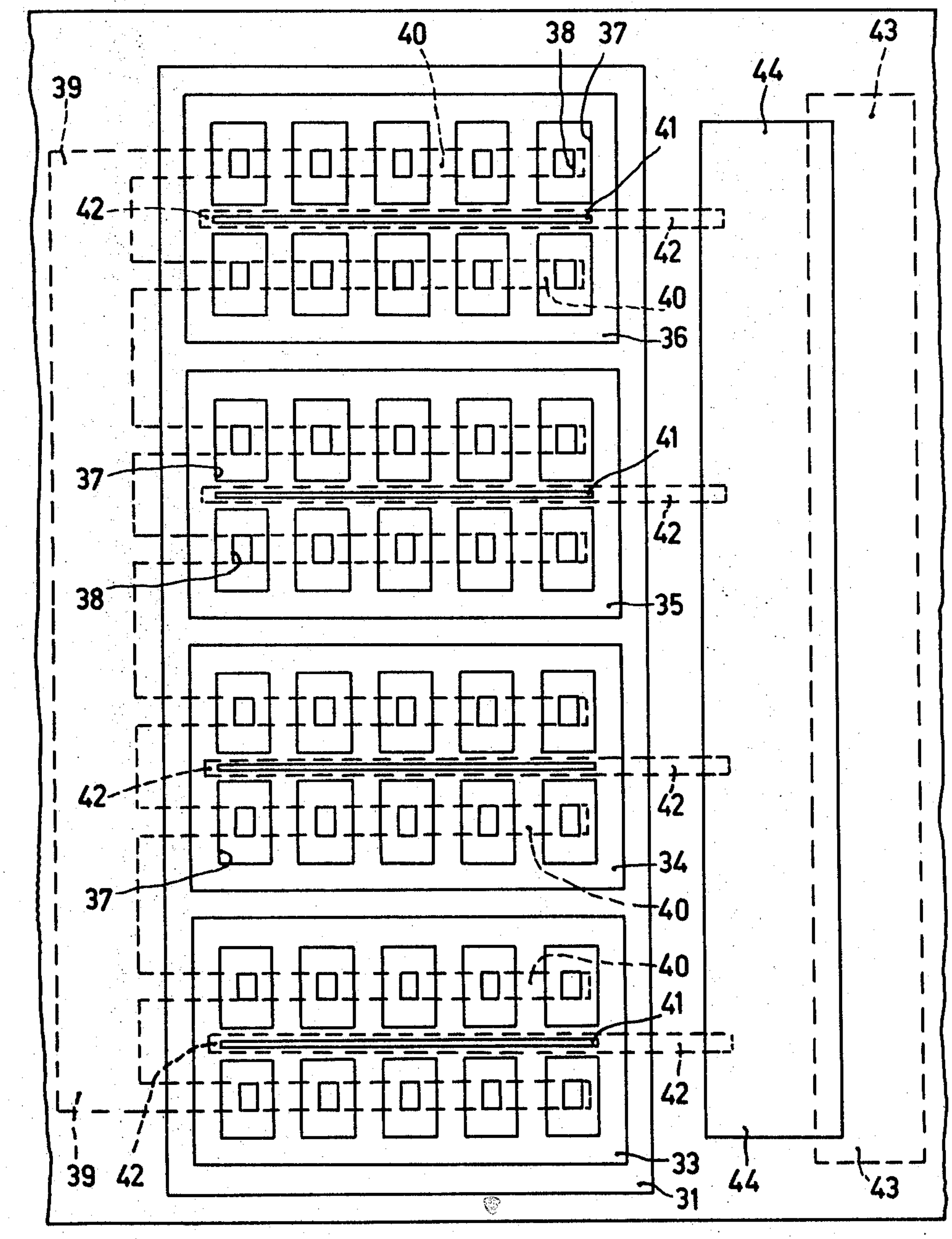

FIG. 2 is a schematic cross-sectional view of this transistor taken along the line II–II of FIG. 1, and FIG. 3 is a schematic top plan view of another embodiment of a transistor in accordance with the invention.

FIGS. 1 and 2 show a transistor comprising a semiconductor body 1 which includes a collector region 2,3 a base region 5 which adjoins a substantially level surface 4, and an emitter region 6,7 which adjoins only the said surface 4 and for the rest is entirely surrounded by the base region 5 and which is provided with aperture 8, the base region 5 adjoining the said surface 4 in the apertures 8 of the emitter region 6,7 and the said surface 4 being provided with an insulating layer 9 which covers at least the line of intersection 10 of the emitter-base junction 11 with this surface 4. At the sites of the said apertures 8 the base region 5 is connected to a base contact layer 12 through windows 13 in the insulating layer 9, while the emitter zone 6,7 is connected to an emitter contact 15 through windows 14 in this insulating layer 9.

It should be noted that in the top plan view of FIG. 1 the insulating layer 9 is assumed to be transparent so as to render visible the underlying regions.

According to the invention, the apertured emitter region 6,7 comprises at least two parts 6 and 7 which are separated from one another by the base region 5.

The two parts 6 and 7 of the emitter region each have three adjacent rows of apertures 8, and the base contact layer 12 situated on the insulating layer 9 has fingers 16 which extend over a row of apertures 8 and at the sites of these apertures 8 are connected to the base region 5, the emitter contact layer 15 situated on the insulating layer 9 having fingers 17 which are connected to the emitter region 6,7. The contact layers 12,16 and 15,17 form an interdigitated system.

Tests have shown that the division of the mesh emitter zone 6,7 in discrete parts 6 and 7 improves the current distribution over the emitter periphery so that a higher permissible current density per unit length of the emitter periphery is obtained than in a single continuous mesh emitter region. This higher current density enables transistors of compact structure to be manufactured which have only a small base collector capacitance while the likelihood of the occurrence of second breakdown is small in normal operation of the transistors.

In this embodiment the emitter region 6,7 has six adjacent rows of circular apertures 8. It should be noted that the shape of the apertures 8 may be different, for example, square, in which event in order to obtain a higher aperture density and a consequent large emitter periphery length per unit area of the transistor the aperture may be arranged so that two opposite vertices of each aperture lie substantially on the axis of the relevant row. In such a configuration, the emitter contact may, in contradistinction to the embodiment shown in which the emitter contact 15 is connected to the emitter region 6, 7 through large windows 14 situated between the rows of apertures 8, be connected to the emitter region through a plurality of rows of smaller windows, which may also be square, each row of these windows being flanked on either side by rows of square apertures 8 and each window being surrounded by four regularly arranged apertures 8. This provides a particularly compact structure of the transistor.

The transistor shown in FIGS. 1 and 2 is a planar epitaxial transistor. The semiconductor body 1 comprises a semiconductor substrate 2 provided with an epitaxial semiconductor layer 3. The base region 5 and the emitter region 6,7 are formed in the epitaxial layer 2, a portion of the collector zone 2,3 adjacent the base region 5 forming part of the epitaxial layer 3 and having a higher resistivity than the remainder 2 of the collector region.

The transistor shown in FIG. 1 and 2 may be manufactured in the following manner.

Manufacture starts from an N-type silicon body 1 which comprises a substrate 2 about 200 $\mu$m. thick and having a resistivity of from 0.01 to 0.001 ohm/cm. on which has been formed a N-type epitaxial layer 3 about 15$\mu$m. thick and having a resistivity of about 2 ohm/cm.

Generally the other dimension of the silicon body are made large enough to enable a plurality of transistors to be simultaneously manufactured, the individual transistors being obtained by dividing the semiconductor body. For simplicity however, in this embodiment the manufacture of a single transistor will be described.

On the epitaxial layer a diffusion mask of, for example, silicon oxide is formed in a manner commonly used in semiconductor technology, a P-type surface region, the base region 5, being formed by diffusion of an impurity, for example boron in the N-type body 1 which forms the collector region 2,3.

The base region 5 has dimensions of about 210 ×110 ×2.5 $\mu$m. and adjoins the substantially plane surface 4 of the epitaxial layer 3.

Then there is formed on the substantially plane surface 4 a diffusion masking layer of, for example, silicon oxide, parts of this layer being subsequently removed by means of conventional photolithographic methods so as to expose surface portions of the base region 5 which correspond to a subsequently formed N-type surface region, i.e. the emitter region 6,7 in the form of a two-part apertured layer. Thus, two apertures are formed in the diffusion masking layer which each have the shape of a mesh, and subsequently by means of diffusion of an impurity, for example phosphorus, the emitter region 6,7 is provided in the form of the meshes 6 and 7 which define aperture 8. Each component emitter region has dimensions of about 90×90×1.5 $\mu$m. and is provided with 12 apertures which have diameters of about 12$\mu$m. The spacing between the apertures is about 8$\mu$m.

The entire surface 4 is then coated with an insulating layer 9 made, for example, of silicon oxide, and in this layer windows 14 of about 8×72 $\mu$m. each and windows 13 having diameters of about 6$\mu$m. are formed in a conventional manner.

Also in a conventional manner the base contact layer 12 having fingers 16 is formed on the insulating layer 9, the fingers being connected to the base regions 5 through the window 13 at the sites of the apertures 8.

Further the emitter contact layer 15 having fingers 17 is provided, the fingers 17 being connected to the emitter region 6,7 through the windows 14.

The contact layers may consist of aluminum.

In a conventional manner connecting leads may be bonded to the contact layers 12 and 15.

A collector contact may be connected to the substrate 2 in a conventional manner and finally the transistor may be encapsulated.

With a view to satisfactory heat dissipation and a small collector series resistance, the thickness of the substrate 2 is preferably reduced, for example, by etching away part of the bottom until the thickness has been reduced to say, about 80$\mu$m.

FIG. 3 is a top plan view of an alternative embodiment of a transistor in accordance with the invention, a base region 31 surrounds an emitter region which for the rest is bounded only by the surface of a semiconductor body 32 and comprises four component parts 33 to 36 separated from one another by the base region 31. The parts 33 to 36 each constitute a component mesh emitter region, the base region 31 adjoining the surface of the semiconductor body 32 in apertures 37. At the sites of the apertures 37 the base region 31 is connected through the windows 38 formed in an insulating layer situated on the semiconductor surface (which layer is assumed to be transparent in the FIG.) to a comb-shaped base contact 39,40 the fingers 40 of which each extend over a row of apertures 37. Each of the parts 33 to 36 of the emitter region has two adjacent rows of apertures 37 and through a window 41 makes contact with a finger 42 of an emitter contact layer 42,43. The two contact layers 39,40 and 42,43 together form an interdigitated system.

This structure in which each component emitter zone has only two rows of apertures provides particularly good results. From the point of view of subdivision this number of rows of apertures, i.e. two, is to be considered as the optimum number for the component regions.

With regard to satisfactory current distribution the path or each of the paths between each of the component emitter regions and the emitter connecting lead preferably includes at least one series resistor. In the embodiment under consideration this has been realized by forming on the insulating layer a resistance layer 44, which may consist of titanium, tantalum, a nickel-chromium alloy or another suitable resistance material. The elongate resistance layer 51 having dimensions of say, 350 ×40$\mu$m. along one long edge is electrically connected to each of the fingers 42 of the emitter contact layer 42,43 and along the opposite long edge makes contact with portion 43 of the emitter contact layer common to the fingers 42. The spacing between each finger 42 and the portion 43 may, for example, be 20$\mu$m. and the resistance layer may have a sheet resistance of a few ohms per square.

The transistor shown in FIG. 3 may be manufactured in a manner similar to that described with reference to the preceding embodiment. The resistance layer 44 may be formed after, but preferably before, the provision of the contact layers 39,40 and 42,43 for example by deposition from vapor in a vacuum through a mask. The lateral bounds of the resistance layer are not critical, and according to the desired values of the series resistors resistance layers may be used which have sheet resistances which may vary, for example, between about 0.1 and 20 ohms per square.

The series resistors for the fingers 42 all form part of the continuous resistance layer 44, the values of the resistors depending upon the resistivity and the thickness of the resistance layer and upon the spacing between each finger 42 and the common contact portion 43.

It should be noted that such a resistance layer which has the advantage of requiring no critical additional steps for its formation, may also take the form of a diffused region. A diffused resistance layer may be formed by a discrete diffusion step and in this case the value of the sheet resistance may be accurately controlled so as to provide series resistors of the desired values. As an alternative, however, the resistance layer may be formed simultaneously with the emitter region and/or the base region of the transistor. In this case, a resistance region is formed at the same time as the base region, the resistance region being insulated from the underlying collector portion by a PN junction. Generally the sheet resistance of this resistance layer will be too high for the series resistors to be provided and in this event at least one region having a considerably lower sheet resistance may be formed within the said resistance region simultaneously with the formation of the emitter region. In order to avoid undesirable transistor action, the PN junctions between this region and the said resistance region is preferably short-circuited, which may simply be effected by arranging the window in the insulating layer, which window in the case of a diffused resistance layer is required for contacting the common portion 43, in a manner and at a location such that the common portion 43 also produces the desired short circuit.

Obviously, the invention is not restricted to the embodiments described, but a person skilled in the art may make many variations without departing from the scope of the invention. For example, the semiconductor body of a transistor in accordance with the invention may consist of a semiconductor material other than silicon, for example, germanium or a $A_{III}B_{V}$ compound. The insulating layer may be made of silicon nitride instead of from silicon oxide. The number of apertures in the emitter region may be greater or smaller than the number mentioned and the apertures may be differently shaped. A transistor in accordance with the invention will generally have an emitter region having at least 10 apertures, because the invention relates to transistors in which one of the desirable properties is a large emitter periphery length. Useful embodiments will generally even have at least 20 apertures in the emitter region. The semiconductor body need not be a substrate provided with an epitaxial layer but it may be a semiconductor body the conductivity of which but for a surface layer has been increased by diffusion of an impurity. The base contact may be connected not only to portions of the base region at the sites of the aperture, but also to parts of the periphery of the base region which are situated entirely outside the emitter region. In addition to the emitter, base and collector regions the semiconductor body may include further regions and may, for example, form part of an integrated circuit.

I claim:

1. A transistor of the mesh-emitter-type comprising a semiconductor body having a substantially plane surface, a collector region in said body, a common base region in the collector region and adjacent the plane surface, at least two laterally spaced emitter regions both within the common base region and each completely surrounded by the latter and adjacent the plane surface, each of said emitter regions being continuous and in the form of a mesh having apertures through which base region portions extend to the plane surface forming emitter-base junction intersections at the plane surface, an insulating layer on the plane surface covering the junction intersections and having emitter contact windows over emitter region portions at the plane surface and the base contact windows over the base region portions extending through the emitter mesh apertures at the plane surface, emitter contact means for connection to the surface emitter region portions through the emitter contact windows, and base contact means base contact means for connection to the surface base region portions through the base contact windows.

2. A transistor as set forth in claim 1 wherein each of said emitter regions comprises at least two rows of mesh apertures, said base contact means comprising a common base contact layer on the insulating layer and a plurality of base contact fingers on the insulating layer each extending over a row of mesh apertures and connected through the base contact windows to the surface base region portions extending through the mesh apertures, said emitter contact means comprising a common contact layer on the insulating layer and a plurality of emitter contact fingers on the insulating layer connected to surface emitter regions through the emitter contact windows and extending substantially parallel to the base contact fingers forming therewith an interdigitated system.

3. A transistor as set forth in claim 2 and including a series resistor in series between the common emitter contact layer and each of the surface emitter regions.

4. A transistor as set forth in claim 3 wherein at least a plurality of said series resistors are united to form part of a continuous resistance layer in series between the common emitter contact layer and each of the emitter contact fingers.

UNITED STATES PATENT OFFICE
CERTIFICATE OF CORRECTION

Patent No. 3576476 Dated April 27, 1971

Inventor(s) GEORGE KERR

It is certified that error appears in the above-identified patent and that said Letters Patent are hereby corrected as shown below:

Column 1, line 35, "and" (first occurrence) should read -- line 47, "partial" should read -- particular --.

Column 2, lines 19 and 23, "connection" should read -- connecting line 60, "aperture" should read -- apertures --.

Column 3, line 23, "aperture" should read -- apertures --.

Column 4, line 29, ", a" should read -- . A --.

Column 6, line 22, cancel "the" (second occurrence).

line 27, cancel "base contact means" (first occurrence)

Signed and sealed this 24th day of August 1971.

(SEAL)
Attest:

EDWARD M.FLETCHER,JR.
Attesting Officer

WILLIAM E. SCHUYLER, JR.
Commissioner of Patents